US012749670B2

(12) United States Patent
Mane et al.

(10) Patent No.: US 12,749,670 B2
(45) Date of Patent: Sep. 29, 2026

(54) METHODS FOR COATING ELECTRODE MATERIALS WITH FLUORIDE COATING AND ELECTRODES FORMED THEREFROM

(71) Applicant: UCHICAGO ARGONNE, LLC, Chicago, IL (US)

(72) Inventors: Anil U. Mane, Naperville, IL (US); Jeffrey W. Elam, Elmhurst, IL (US); Pragathi Darapaneni, Lemont, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 17/323,673

(22) Filed: May 18, 2021

(65) Prior Publication Data

US 2022/0293900 A1 Sep. 15, 2022

Related U.S. Application Data

(60) Provisional application No. 63/158,668, filed on Mar. 9, 2021.

(51) Int. Cl.

| | |
|---|---|
| ***H01M 4/04*** | (2006.01) |
| ***H01M 4/36*** | (2006.01) |
| ***H01M 4/505*** | (2010.01) |
| ***H01M 4/525*** | (2010.01) |
| ***H01M 4/58*** | (2010.01) |
| ***H01M 10/0525*** | (2010.01) |

(52) U.S. Cl.

CPC ......... *H01M 4/0428* (2013.01); *H01M 4/366* (2013.01); *H01M 4/505* (2013.01); *H01M 4/525* (2013.01); *H01M 4/58* (2013.01); *H01M 10/0525* (2013.01)

(58) Field of Classification Search

None

See application file for complete search history.

(56) References Cited

U.S. PATENT DOCUMENTS

| | | | |
|---|---|---|---|
| 4,009,052 | A | 2/1977 | Whittingham |
| 8,535,832 | B2 | 9/2013 | Karthikeyan et al. |
| 8,906,449 | B2 | 12/2014 | Li et al. |

(Continued)

FOREIGN PATENT DOCUMENTS

| | | | |
|---|---|---|---|
| CN | 111952544 | A | 11/2020 |
| EP | 3 026 738 | A1 | 6/2016 |

(Continued)

OTHER PUBLICATIONS

Aurbach, et al., "A short review of failure mechanisms of lithium metal and lithiated graphite anodes in liquid electrolyte solutions," Solid State Ionics 148(3-4), pp. 405-416 (2022).

(Continued)

*Primary Examiner* — Zhongqing Wei

(74) *Attorney, Agent, or Firm* — Foley & Lardner LLP

(57) ABSTRACT

A process for forming a fluoride-based coating on an electrode material that is at least partially covered with a surface carbonate, includes disposing the electrode material in a reactor. The electrode material is exposed to a vapor of a fluoride-based precursor material such that the fluoride-based precursor material dopes the surface carbonate so as to form a layer of a fluoride coating on the electrode material.

16 Claims, 12 Drawing Sheets

(56) References Cited

U.S. PATENT DOCUMENTS

| | | | |
|---|---|---|---|
| 10,553,874 B2 | 2/2020 | Elam et al. | |
| 11,276,879 B2 | 3/2022 | Kim et al. | |
| 2004/0072066 A1 | 4/2004 | Cho et al. | |
| 2005/0074983 A1 | 4/2005 | Shinriki et al. | |
| 2011/0070141 A1 | 3/2011 | Sneh | |
| 2012/0301778 A1 | 11/2012 | Trevey et al. | |
| 2013/0177808 A1 | 7/2013 | Wang et al. | |
| 2013/0333835 A1 | 12/2013 | Carcia et al. | |
| 2013/0337259 A1 | 12/2013 | Carcia et al. | |
| 2014/0008568 A1 | 1/2014 | Fujdala et al. | |
| 2015/0159271 A1 | 6/2015 | Lee et al. | |
| 2015/0180023 A1 | 6/2015 | Xiao et al. | |
| 2015/0357494 A1 | 12/2015 | Dean et al. | |
| 2015/0364747 A1 | 12/2015 | Elam et al. | |
| 2016/0351973 A1 | 12/2016 | Albano et al. | |
| 2017/0263935 A1 | 9/2017 | Kozen et al. | |
| 2017/0338522 A1 | 11/2017 | Hu et al. | |
| 2018/0277830 A1 | 9/2018 | Xing | |
| 2019/0036120 A1 | 1/2019 | Kornbluth et al. | |
| 2019/0044151 A1* | 2/2019 | Elam | H01M 4/628 |
| 2019/0103231 A1 | 4/2019 | Chai et al. | |
| 2019/0312254 A1 | 10/2019 | Xiao | |
| 2020/0052326 A1 | 2/2020 | Hu et al. | |
| 2020/0075960 A1 | 3/2020 | Wachsman et al. | |
| 2020/0274138 A1 | 8/2020 | Weimer et al. | |
| 2021/0183674 A1 | 6/2021 | Mcbriarty et al. | |
| 2021/0234153 A1 | 7/2021 | Xiao et al. | |
| 2021/0336240 A1* | 10/2021 | Mane | C23C 16/56 |
| 2021/0359338 A1 | 11/2021 | Duggal et al. | |
| 2022/0298626 A1 | 9/2022 | Kang et al. | |
| 2022/0298633 A1 | 9/2022 | Weimer et al. | |

FOREIGN PATENT DOCUMENTS

| | | |
|---|---|---|
| EP | 3 883 044 A1 | 9/2021 |
| WO | WO-2016/025866 A1 | 2/2016 |
| WO | WO-2016/057426 A1 | 4/2016 |
| WO | WO-2020/257176 A1 | 12/2020 |

OTHER PUBLICATIONS

Aurbach, et al., "The Study of Surface Phenomena Related to Electrochemical Lithium Intercalation into Lix MOy Host Materials (M=Ni, Mn)," Journal of the Electrochemical Society 147(4), pp. 1322-1331 (2000).

Kozen, et al., "Next-Generation Lithium Metal Anode Engineering via Atomic Layer Deposition," ACS Nano 9(6), pp. 5884-5892 (2015).

Shin, et al., "Comparison of Solvent-Cast and Hot-Pressed P(EO)20LIN(SO2CF2CF3)2 Polymer Electrolytes Containing Nanosized SiO2," Journal of the Electrochemical Society 152(2), pp. A283-A288 (2005).

Shin, et al., "PEO-Based Polymer Electrolytes with lonic Liquids and Their Use in Lithium Metal-Polymer Electrolyte Batteries," Journal of the Electrochemical Society 152(5), pp. A978-A983 (2005).

Whittingham, "Electrical Energy Storage and Intercalation Chemistry," Science 192(4244), pp. 1126-1127 (1976).

Zheng, et al., "Interconnected hollow carbon nanospheres for stable lithium metal anodes," Nature Nanotechnology 9, pp. 618-623 (2014).

Han, et al., "Negating interfacial impedance in garnet-based solid-state Li metal batteries," Nature Materials 16, pp. 572-579 (2017) (advanced online publication provided; 9 pages).

Julien & Mauger, "Functional behavior of AIF3 coatings for high-performance cathode materials for lithium-ion batteries," AIMS Materials Science 6(3), pp. 406-440 (2019).

Lee, et al., "High-energy long-cycling all-solid-state lithium metal batteries enabled by silver-carbon composite anodes," Nature Energy 5, pp. 299-308 (2020).

Lin, et al., "Reviving the lithium metal anode for high-energy batteries," Nature Nanotechnology 12, pp. 194-206 (2017).

McCloskey, et al., "Twin Problems of Interfacial Carbonate Formation in Nonaqueous Li—O2 Batteries," The Journal of Physical Chemistry Letters 3(8), pp. 997-1001 (2012).

Talik, et al., "Electronic and crystal structure, EPR and magnetic investigations of YF3:1%RE (Re=Pr, Ho, Er and Tm) and LaF3:1% Pr nanocrystals," Journal of Alloys and Compounds 616, pp. 556-568 (2014).

Xu, et al., "Artificial Interphases for Highly Stable Lithium Metal Anode," Matter 1(2), pp. 317-344 (2019).

Zhang, et al., "Coralloid Carbon Fiber-Based Composite Lithium Anode for Robust Lithium Metal Batteries," Joule 2(4), pp. 764-777 (2018).

Zhang, et al., "Lithiophilic-lithiophobic gradient interfacial layer for a highly stable lithium metal anode," Nature Communications 9, 3729, 11 pages (2018).

Arnold, et al., "Synthesis of Fluorine-Doped Lithium Argyrodite Solid Electrolytes for Solid-State Lithium Metal Batteries," ACS Applied Materials & Interfaces 14(9), pp. 11483-11492 (2022) (28 page accepted manuscript provided).

Boulineau, et al., "Mechanochemical synthesis of Li-argyrodite Li6PS5X (X=Cl, Br, I) as sulfur-based solid electrolytes for all solid state batteries application," Solid State Ionics 221, pp. 1-5 (2012).

Deiseroth, et al., "Li7PS6 and Li6PS5X (X: Cl, Br, I): Possible Three-dimensional Diffusion Pathways for Lithium Ions and Temperature Dependence of the Ionic Conductivity by Impedance Measurements," Zeitschrift fur anorganische und allgemeine Chemie 637(10), pp. 1287-1294 (2011).

Tokyo Institute of Technology, "Solid electrolytes open doors to solid-state batteries," Phys.org, retrieved from https://phys.org/news/2016-03-solid-electrolytes-doors-solid-state-batteries.html on Sep. 27, 2023, 6 pages (2016).

Yu, et al., "Revealing the relation between the structure, Li-ion conductivity and solid-state battery performance of the argyrodite Li6PS5Br solid electrolyte," Journal of Materials Chemistry A 5(40), pp. 21178-21188 (2017).

Bi, et al., "Stability of Li2CO3 in cathode of lithium ion battery and its influence on electrochemical performance," RSC Advances 6(23), pp. 19233-19237 (2016).

Chen, et al., "Mechanism for Al2O3 Atomic Layer Deposition on LiMn204 from In Situ Measurements and Ab Initio Calculations," Chem 4(10), pp. 2418-2435 (2018).

Croy, et al., "Prospects for spinel-stabilized, high-capacity lithium-ion battery cathodes," Journal of Power Sources 334, pp. 213-220 (2016).

Darapaneni, et al., "Elucidating the Redox Behavior during Atomic Layer Deposition on Lithium-Ion Battery Cathode Materials," Chemistry of Materials 33(20), pp. 8079-8088 (2021).

Gutierrez, et al., "Multifunctional Films Deposited by Atomic Layer Deposition for Tailored Interfaces of Electrochemical Systems," Journal of the Electrochemical Society 167(14):140541 (2020) (24 page accepted manuscript provided).

Kang, et al., "Modification of LiMn2O4 surfaces by controlling the Acid-Base surface chemistry of atomic layer deposition," Applied Surface Science 599:153329 (2022) (45 page accepted manuscript provided).

Long, et al., "Advances in Stabilizing 'Layered-Layered' xLi2MnO3 x (1-x)LiMO2 (M=Mn, Ni, Co) Electrodes with a Spinel Component," Journal of the Electro Chemical Society 161(14), pp. A2160-A2167 (2014).

Park, et al., "Ultrathin Lithium-Ion Conducting Coatings for Increased Interfacial Stability in High Voltage Lithium-Ion Batteries," Chemistry of Materials 26(10), pp. 3128-3134 (2014).

Wang, et al., "Synthesis of high capacity cathodes for lithium-ion batteries by morphology-tailored hydroxide co-precipitation," Journal of Power Sources 274, pp. 451-457 (2015).

Young, et al., "High-Rate Spinel LiMn2O4 (LMO) Following Carbonate Removal and Formation of Li-Rich Interface by ALD Treatment," The Journal of Physical Chemistry C 123(39), 23783-23790 (2019).

* cited by examiner

METHODS FOR COATING ELECTRODE MATERIALS WITH FLUORIDE COATING AND ELECTRODES FORMED THEREFROM

CROSS-REFERENCE TO RELATED APPLICATIONS

This application claims priority to and the benefit of U.S. Provisional Application No. 63/158,668, filed Mar. 9, 2021, the content of which is incorporated by reference herein in its entirety.

GOVERNMENT SUPPORT CLAUSE

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to methods for coating electrode materials with a fluoride based coating and electrode materials formed using such methods.

BACKGROUND

Advanced electrodes for use in electrochemical cells (e.g., batteries) such as Li-ion cathodes (e.g., $Li_2CO_3$, $LiCoO_2$, $LiMnO_2$, $LiNiO_2$, $LiMn_2O_4$, and LiNiMnCoO (NMC) cathodes) can deliver high energies and capacities. Lithium ion batteries (LIBs) are projected to be a $6 billion industry by 2027 and are a large focus in fields such as electric vehicles. However, for such batteries to be reliably used in applications and operate successfully in practical electrochemical cells, stabilization of interfaces is desirable. This is particularly true for electrochemical systems that have a propensity for cathode-surface reactions, oxygen activity, and transition metal dissolution.

SUMMARY

Embodiments described herein relate generally to electrodes for use in electrochemical devices, and in particular, to systems and methods for surface modification of a surface carbonate using precursor vapor phase synthesis or atomic layer deposition so as to form fluoride coatings on electrode materials.

In some embodiments, a method comprises disposing an electrode material that is at least partially covered with a surface carbonate, in a reactor. The method further comprises flowing a vapor of a fluoride-based precursor material into the reactor such that the fluoride-based precursor material dopes the surface carbonate so as to form a layer of a fluoride coating on the electrode material.

In some embodiments, a composite electrode material comprises an electrode core, a surface carbonate disposed on the cathode core, and a fluoride coating deposited on the cathode core such that the fluoride-based material of the fluoride coating dopes the surface carbonate.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are not, therefore, to be considered limiting of its scope, the disclosure will be described with additional specificity and detail through use of the accompanying drawings.

Figure 1:
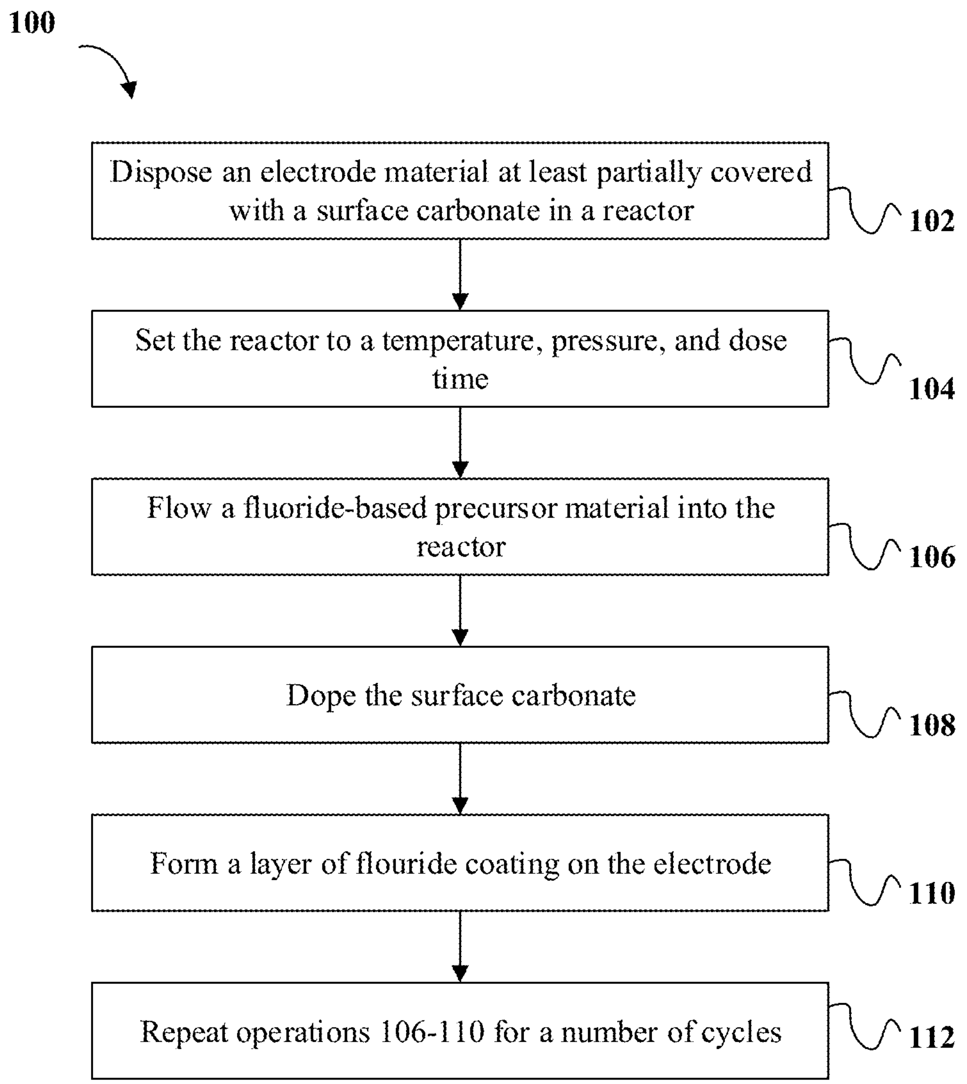
FIG. 1 is a schematic flow diagram of a method for forming a fluoride coating on an electrode at least partially covered with a surface carbonate, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to electrodes for use in electrochemical devices, and in particular, to systems and methods for surface modification of a surface carbonate via fluorination using precursor vapor phase synthesis or atomic layer deposition so as to form fluoride coatings on electrode materials.

The fabrication of robust electrode-electrolyte interfaces in lithium ion batteries (LIBs) has been the focus of battery research to improve the cycling stability and efficiency of LIBs. LIBs, in general, suffer irreversible capacity losses during high voltage operation due, in part, to corrosion of active materials in the acidic electrolyte as well as electrolyte decomposition. Small levels of moisture (e.g., in a range of 20-100 ppm) present in battery-grade electrolytes can react with lithium salts (e.g. $LiPF_6$) to generate hydrofluoric acid (HF). HF subsequently attacks the surfaces of electrode materials causing transition metal dissolution and migration to the negative electrode.

Furthermore, lithium carbonate ($Li_2CO_3$) has frequently been avoided in solid-state electrolyte applications due to its lower ionic conductivity and decomposition as $CO_2$ upon multiple cycling. Carbonate formation in lithium ion batteries can hamper the performance of the LIBs, therefore it is desirable to clean the surface carbonate from the current best performing commercial Li-based cathodes. Carbonates can form spontaneously on LIB cathode materials when these materials are exposed to ambient conditions during processing and fabrication due to chemical reactions with atmospheric carbon dioxide and other species. Once formed, these surface carbonates can be challenging to remove and can degrade the performance of the LIBs. Formation of a LiF coating on cathodes show improved electrochemical performance by mitigating irreversible side reactions, stabilizing the electrode material over long term cycling, protecting against HF attack, and acting as an ionic conductor. Moreover, LiF can prevent the formation of surface carbonates upon atmospheric exposure. The high electronegativity of fluorine results in strongly bonded cations relative to oxygen and should be beneficial in limiting unwanted surface reactions. However, current processes result in difficulty in scalability or non-uniform distribution of the dopant. After cycling, the coating could begin to corrode, leading to transition metal dissolution and electrolyte decomposition.

Methods described herein result in the formation of LiF coatings on cathode materials that have surface carbonates. Surface-specific X-ray photoelectron spectroscopy studies indicate the formation of adequate LiF shell layer around the core $Li_2CO_3$ particles upon adsorption of F from hydrogen fluoride pyridine (HFpy) precursor. These results demonstrate that the surface of $Li_2CO_3$ can be protected by an ionic conductive LiF shell and thereby, prevent the carbonate decomposition while simultaneously improving the ionic conductivity of the material. Using a preset report fluorine based vapor phase surface treatment approach, surface carbonates can be reduced in a controlled manner and the formation of mainly $Li_xF_y$ but not limited to other metal fluoride ($M_xF_y$) barrier layer formation (where M=Co, Ni, Mn, Al, Fe, etc.) can be improved.

Various embodiments of the composite electrode materials may provide one or more benefits including, for example: (1) stabilizing the cathodes and the electrodes, particularly electrode/electrolyte interfaces; (2) preventing cathode surface oxygen activity and transition metal dissolution; (3) protecting from HF attack; (4) low temperature deposition (e.g., at less than 150 degrees Celsius) allowing implementation of the fluoride coatings; (5) providing high control over growth, composition, and interface; (6) providing scalability for high volume processing and deposition; (7) allowing implementation with a variety of cathode and anode chemistries; (8) removing or reducing surface carbonates; (9) increasing the lifetime of the cathode or electrode material; (10) providing long term protection from carbonate formation; (11) providing an ionic conductor; (12) improving LIBs cycle life time due to the stability of the active materials; (13) providing a low cost option; and (14) providing alternatives to current solid state electrolytes such as $LiPF_6$ and LiPON which are difficult to synthesize.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

FIG. 1 is a schematic flow diagram of a method 100 for providing a fluoride coating to an electrode material that is at least partially covered with a surface carbonate, according to an embodiment. The method 100 may be implemented in a reactor. In some embodiments, the method may include a vapor based process. Possible vapor based processes include chemical vapor deposition (CVD) and precursor vapor phase synthesis. In some embodiments, the method 100 may include an atomic layer deposition (ALD) process. Advantages of vapor phase processing includes ultrathin coating, coating at lower temperatures (e.g., in a range of 40 degrees Celsius to 250 degrees Celsius, inclusive), and precise doping of dopant elements.

Expanding further, CVD is a vacuum deposition method used to produce thin films by reacting one or more volatile precursors which react and/or decompose on the surface of the substrate to produce a desired deposit. Similarly, vapor phase synthesis involves the generation of a vapor of the material of interest, followed by the condensation of clusters and nanoparticles from the vapor phase, or reaction of the vapor phase with surface atoms of molecules of a substrate to form a coating. Advantages of single precursor vapor phase synthesis include lower processing temperatures, lower processing costs, reduced processing time, and less degradation in the electrode materials. ALD is a modified form of CVD that uses the self-limiting nature of specific precursors to deposit films in a layer-by-layer fashion. ALD is particularly well-suited for coating electrode surfaces such as cathode powders with complex, 3D geometry in that a conformal (i.e., uniform in thickness and conforming to the contours of a material such as the electrode core 102) coating can be applied with precise control of thickness and composition. Conventional ALD-coated electrodes have primarily focused on metal oxides such as $Al_2O_3$, $TiO_2$, $LiAlO_2$, and $LiTaO_3$ because the ALD chemistry of these oxides is well known. Metal fluoride growth by ALD is complex and challenging, mainly due to the lack of suitable fluorine precursors. For example, HF, a highly aggressive chemical etching agent, has been used to deposit $CaF_2$, $ZnF_2$, and $SrF_2$. More recently, alternative ALD chemistries have been developed such as $MgF_2$ and LiF ALD using either $TaF_5$ or $TiF_4$ as the fluorine precursor for optical applications. However, the substrate temperatures in these cases were 300-400 degrees Celsius, high enough to degrade battery electrode laminates containing polymeric binders. Another potential limitation of $AlF_3$ for Li-ion batteries is that it is a wide-bandgap dielectric and hence electrically insulating. Although still promising as a coating, methods to enhance the material's conductivity while maintaining its superb resistance to chemical attack could be advantageous.

As shown in FIG. 1, the method 100 includes disposing an electrode material that is at least partially covered with a surface carbonate in a reactor, at 102. In some embodiments, the electrode material may be fully covered with a surface carbonate, for example, the particle 200 described with respect to FIG. 2. In some embodiments, the surface carbonate may include $Li_2CO_3$. The surface carbonate may include a lithium carbonate layer or film, for example, a film that has formed upon exposing the surface bulk electrode material to ambient air.

In some embodiments, the electrode material may be a cathode material. In such embodiments, the electrode core may include one of $Li_2CO_3$, $LiCoO_2$, $LiMnO_2$, $LiNiO_2$, $LiMn_2O_4$, $LiNi_{0.5}Mn_{0.3}Co_{0.2}O_2$, $LiNi_{0.8}Mn_{0.1}Co_{0.1}O_2$, high voltage spinels (e.g., $LiMn_{0.75}Ni_{0.25}O_4$ and variations thereof) or any other suitable cathode material. In some embodiments, the electrode material may include an ionically conducting solid state electrolyte material such as $LiLaZrO_2$. In other embodiments, the electrode may include an anode material. In such embodiments, the electrode core may include graphite and or any other carbonaceous material such as, for example, carbon powder, pyrolytic carbon, carbon black, carbon fibers, carbon microfibers, carbon nanotubes (CNTs), single walled CNTs, multi walled CNTs, fullerene carbons including "bucky balls", graphene sheets and/or aggregate of graphene sheets, any other carbonaceous material or combination thereof. In other embodiments, the anode material may include a lithium anode. In still other embodiments, the anode material may include a silicon or silicon carbon composite anode. The electrode core may include a formed electrode (e.g., casted or coated to form a solid electrode) or a powder comprising one or more materials included in the electrode core formulation.

At 104, the method 100 further comprises setting the reactor to a temperature, pressure, and dose time. In some embodiments, the temperature of the reactor may be in a low temperature range of 40° C. to 250° C., inclusive (e.g., 40, 60, 80, 100, 120, 140, 160, 180, 200, 220, 240, 250° C., inclusive). In some embodiments, the reactor may be heated before the electrode material is placed into the reactor. In some embodiments, the pressure of the reactor may be in a low pressure range, for example, a range of 0.1 Torr to 100 Torr, inclusive (e.g., 0.1, 0.5, 1, 5, 10, 50 or 100 Torr, inclusive). In some embodiments, the dose time of the reactor may be from 0.1 second to 30 seconds, inclusive (e.g., 0.1, 0.5, 1, 5, 10, or 30 seconds, inclusive).

At 106, the method 100 further comprises flowing a fluoride-based precursor into the reactor. In some embodiments, the fluoride-based precursor material comprises a vapor formed from a solution of hydrogen fluoride dissolved in pyridine (HFpy). The vapor delivered from the HFpy is nearly pure HF and is much safer compared to a compressed gas source of HF. The HFPy is stable and vaporizes at low temperatures and is capable of with reacting with the surface carbonate. The fluoride-based precursor material may cause a reaction with the surface carbonate, which reduces an amount of surface carbonate on the electrode material. In some embodiments, the method 100 requires only a single precursor.

At 108, the method 100 further comprises doping the surface carbonate. At 110, the method 100 further comprises forming a layer of fluoride coating on the electrode material. In some embodiments, the fluoride coating may comprise LiF. In some embodiments, reaction of the flowed fluoride-based precursor material causes the surface carbonate to be doped and results in formation of the fluoride coating. In some embodiments, the fluoride coating may comprise at least one of $Co_xF_y$, $Ni_xF_y$, $Mn_xF_y$, $Al_xF_y$, $Fe_xF_y$, where x and y are greater than 0. In some embodiments, the fluoride coating may comprise mixtures of metal fluoride components such as $Li_aNi_bCo_cMn_dF_e$ where a, b, c, d, and e are greater than 0. In some embodiments, the formation of the fluoride coating layer is from the adsorption of fluorine from HFpy precursor, or reaction of the HFpy precursor with the surface carbonate (e.g., $Li_2CO_3$) resulting in consumption of the surface carbonate and formation of a fluoride coating, for example LiF coating on the electrode material. In some embodiments, the fluoride coating may be conformally or uniformly coated on the surface carbonate such that the coating has about the same thickness at each location where the coating is present. A conformal layer would protect the electrode material after multiple cycles, increasing the lifetime of the electrode material. In some embodiments, the fluoride coating has a thickness in a range of 1 nm to 5 nm. Such a small thickness may allow the fluoride coating to stabilize the electrode core without having any significant impact on the impedance. The fluoride coating may prevent carbonate formation while simultaneously improving the ionic conductivity of the electrode material.

In some embodiments, the method 100 may also include repeating operations 106-110 for a number of cycles, at 112 (e.g., 1 cycles to 10 cycles). In some embodiments, the cycles may be performed sequentially.

In various embodiments, other post-processing operations may be performed, for example, to improve a texture of the coating, improve adhesion to the electrode core, and/or improve electrical properties (e.g., allow coating materials to mix with cation materials). Such post-processing operations may include, but are not limited to annealing at an annealing temperature (e.g., annealing at a temperature below 200 degrees Celsius), for an annealing time, or any other post-processing operation as are commonly known in the arts.

Figure 2A:
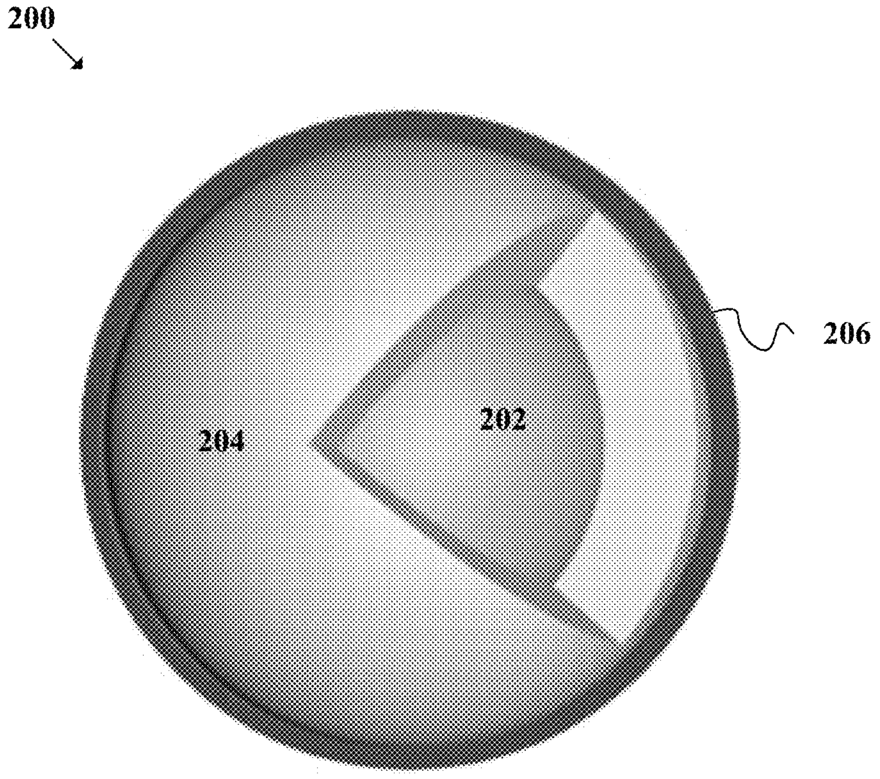
FIG. 2A-2B are cross-section views of a composite electrode material, according to an embodiment.
Figure 2B:
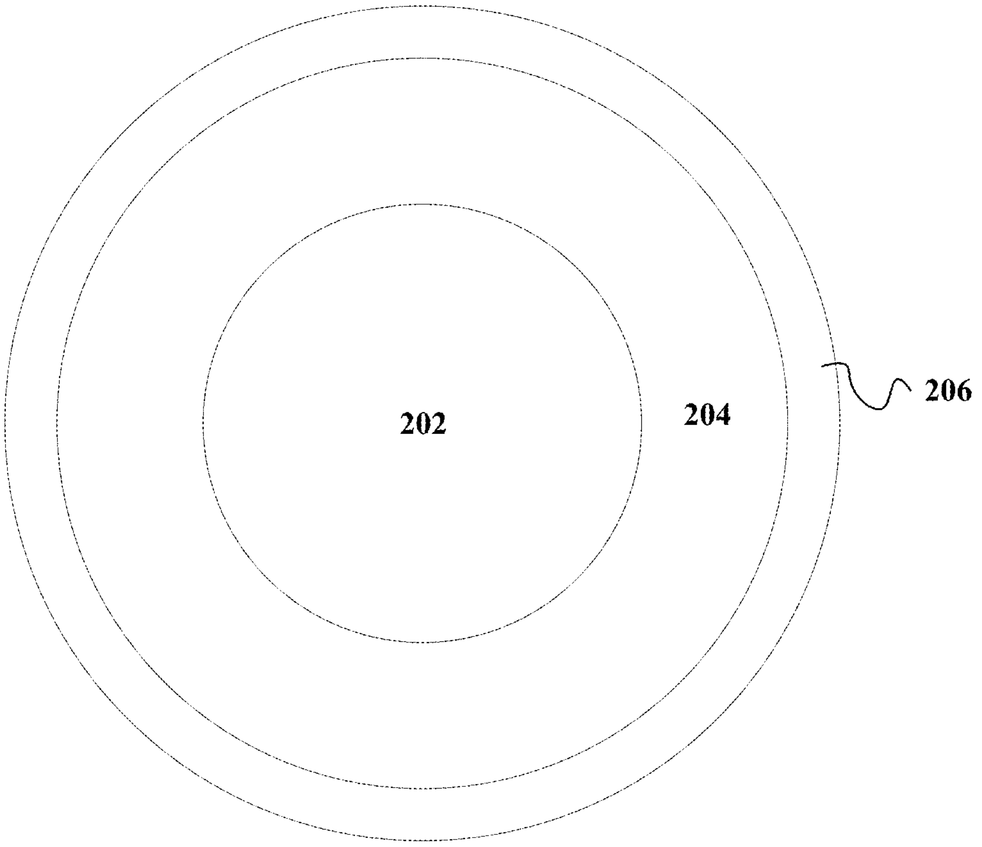

FIG. 2A is a side, perspective view of a composite electrode material 200 with a portion of a surface carbonate layer 204 removed to show an electrode core 202, according to an embodiment. FIG. 2B shows a 2-dimensional cross-section view of the electrode material 200 of FIG. 2A. The composite electrode material 200 includes the electrode core 202 including a surface carbonate 204 and coated with a fluoride coating 206. In some embodiments, the composite electrode material 200 may include a cathode material. In such embodiments, the electrode core 202 may include one or more of $Li_2CO_3$, $LiCoO_2$, $LiMnO_2$, $LiNiO_2$, $LiMn_2O_4$, $LiNi_{0.5}Mn_{0.3}Co_{0.2}O_2$, $LiNi_{0.8}Mn_{0.1}Co_{0.1}O_2$, high voltage spinels (e.g., $LiMn_{0.75}Ni_{0.25}O_4$ and variations thereof) or any other suitable cathode material. In some embodiments, the electrode material 200 may include an ionically conducting solid state electrolyte material such as $LiLaZrO_2$. In other embodiments, the electrode material 200 may include an anode material. In such embodiments, the electrode core 202 may include graphite and or any other carbonaceous material such as, for example, carbon powder, pyrolytic carbon, carbon black, carbon fibers, carbon microfibers, carbon nanotubes (CNTs), single walled CNTs, multi walled CNTs, fullerene carbons including "bucky balls," graphene sheets and/or aggregate of graphene sheets, any other carbonaceous material or combination thereof. In other embodiments, the anode material may include a lithium anode. In still other embodiments, the anode material may include a silicon or silicon carbon composite anode. The electrode core 202 may include a formed electrode (e.g., casted or coated to form a solid electrode) or a powder comprising one or more materials included in the electrode core 202 formulation.

The composite electrode material 200 includes the surface carbonate 204 disposed on the electrode core 202. In some embodiments, the surface carbonate may be $Li_2CO_3$. In some embodiments, the surface carbonate may be comprised of $NiCO_3$, $Ni_2(CO_3)_3$, $CoCO_3$, $Co_2(CO_3)_3$, $Co(CO_3)_2$, $MnCO_3$, $Mn_2(CO_3)_3$, or $Mn(CO_3)_2$, any other carbonate material, or combination thereof. In some embodiments, the surface carbonate at least partially covers the electrode core. In some embodiments, the surface carbonate fully covers the electrode core.

The composite electrode material 200 also includes a fluoride coating 206 deposited on the electrode core such that the fluoride-based material of the fluoride coating dopes the surface carbonate. In some embodiments, the fluoride coating causes a reaction with the surface carbonate, reducing an amount of the surface carbonate on the composite electrode material. In some embodiments, the surface carbonate may be completely removed from the surface of the electrode material. In some embodiments, the fluoride coating 206 may conformally or uniformly coat the surface carbonate such that the fluoride coating has about the same thickness at each location where the fluoride coating is present. A conformal layer may protect the electrode material after multiple charge/discharge cycles. In some embodiments, the fluoride coating 206 may comprise LiF. In other embodiments, the fluoride coating comprises at least one of a metal fluoride such as $Co_xF_y$, $Ni_xF_y$, $Mn_xF_y$, $Al_xF_y$, $Fe_xF_y$, where x and y are greater than 0. In some embodiments, the fluoride coating may comprise mixtures of metal fluoride components such as $Li_aNi_bCo_cMn_dF_e$ where a, b, c, d, and e are greater than 0. In some embodiments, the fluoride coating has a thickness in a range of 1 nm to 5 nm, inclusive.

Some embodiments may include multiple composite electrode materials 200 configured to function in an electrochemical cell.

The following section describes examples of composite electrode materials including a baseline electrode having a surface carbonate with no coating, and an electrode material having a surface carbonate and a fluoride coating. These examples are only for illustrative purposes and are not meant to limit the scope of the concepts described herein.

EXPERIMENTAL EXAMPLES

Figure 3B:
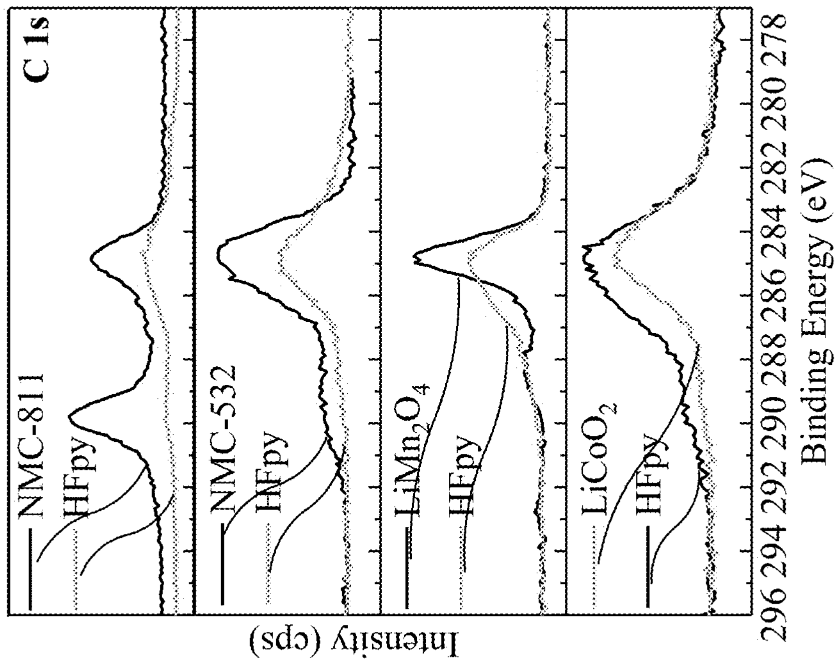
FIG. 3A-3F show the C 1s X-ray photoelectron spectroscopy (XPS) plots at 15 Torr hydrogen fluoride-pyridine (HFpy) pressure with varying cathode materials as the electrode material (FIG. 3A-3D), varying HFPy pressures (FIG. 3E), and varying dose times (FIG. 3F).
Figure 3A:
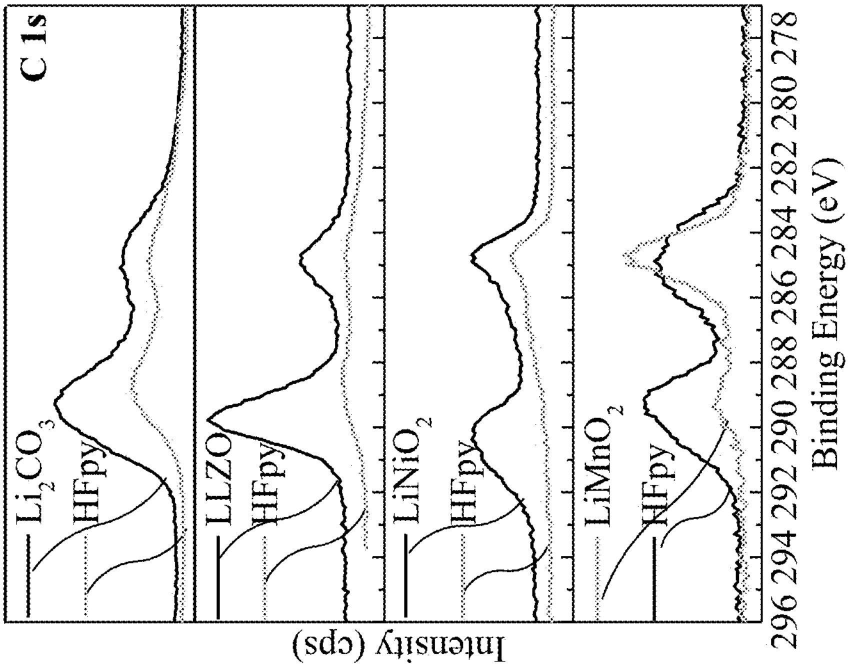
Figure 3D:
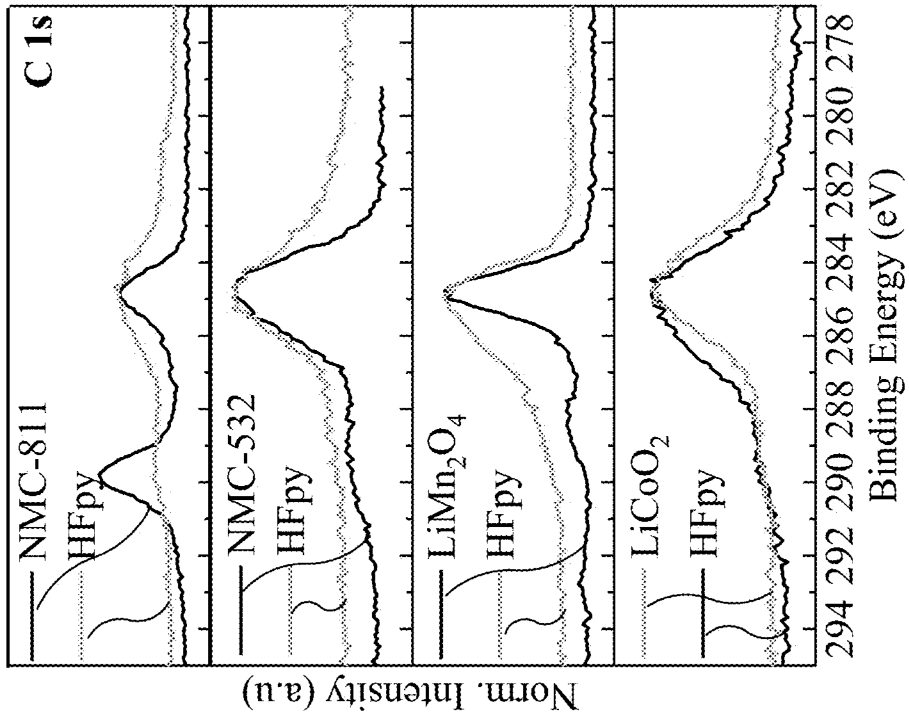
Figure 3C:
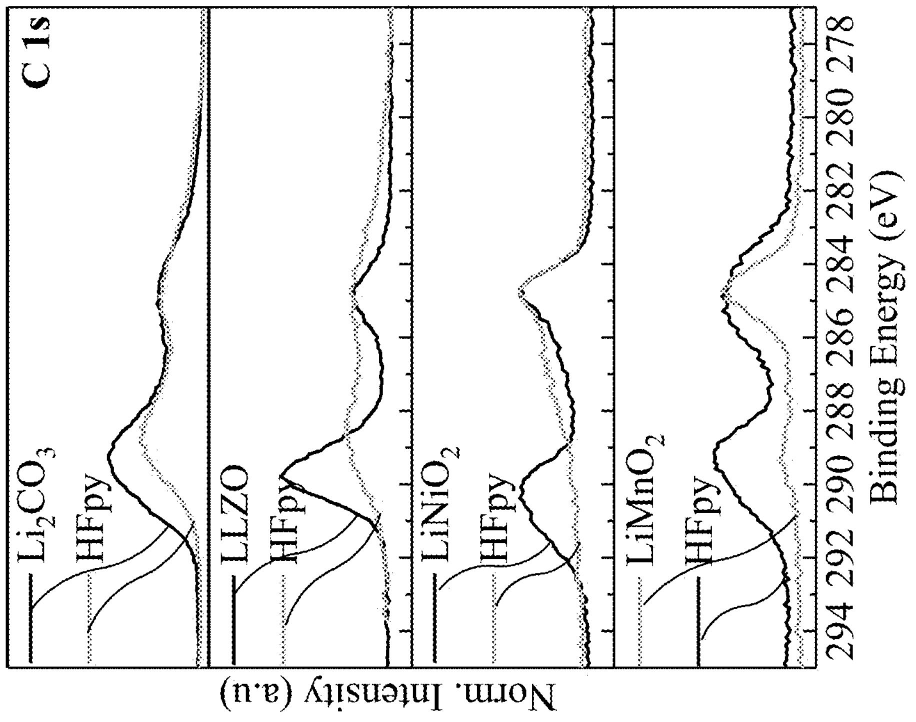

FIG. 3A-3D show the results of C is X-ray photoelectron spectroscopy (XPS) before treatment and after treatment. For the experiments analyzed in FIG. 3A-3D, the treatment process involved flow of HFpy vapor to carbonate covered cathode materials at 15 Torr in a reactor at 100° C. FIG. 3A shows the carbonate peak at 290 eV upon HFpy adsorption for four cathode materials ($Li_2CO_3$, $LiLaZrO_2$ (LLZO), $LiNiO_2$, and $LiMnO_2$) with a reduction in the carbonate peak for $Li_2CO_3$, $LiLaZrO_2$, and $LiNiO_2$. FIG. 3B shows the carbonate peak upon HFpy adsorption for four other cathode materials ($LiNi_{0.8}Mn_{0.1}Co_{0.1}O_2$ (NMC-811), $LiNi_{0.5}Mn_{0.3}Co_{0.2}O_2$ (NMC-532), $LiMn_2O_4$, and $LiCoO_2$) with a reduction in the carbonate peak for $LiNi_{0.8}Mn_{0.1}Co_{0.1}O_2$ and $LiNi_{0.5}Mn_{0.3}Co_{0.2}O_2$. FIG. 3C-D shows the XPS plot normalized to atmospheric carbon 284.8 eV for eight cathode materials ($Li_2CO_3$, $LiLaZrO_2$, $LiNiO_2$, and $LiMnO_2$, $LiNi_{0.8}Mn_{0.1}Co_{0.1}O_2$, $LiNi_{0.5}Mn_{0.3}Co_{0.2}O_2$, $LiMn_2O_4$, and $LiCoO_2$) where a reductive carbonate peak at 290 eV is seen for most cathode materials.

Figure 3F:
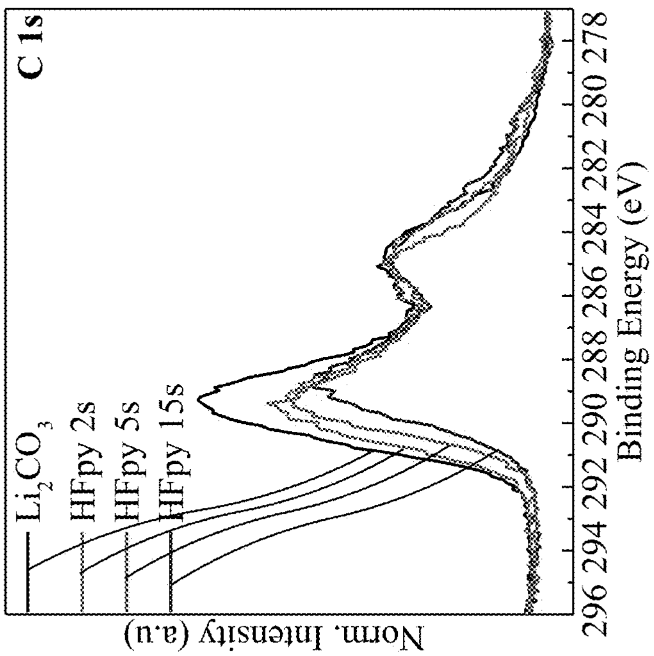
Figure 3E:
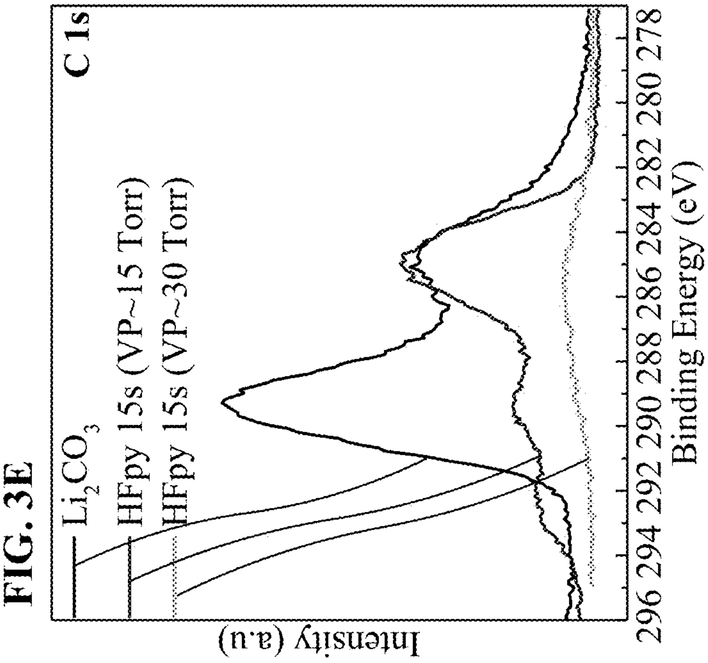

FIG. 3E shows reduction of the carbonate peak upon HFpy adsorption for a dose time of 15 seconds at 15 Torr, and at 30 Torr at 100° C. FIG. 3F shows reduction of the carbonate peak upon HFpy adsorption for varying dose times at 15 Torr. A dose time of 2 seconds reduced carbonate formation by 18%. A dose time of 5 seconds reduced carbonate formation by 25%. A dose time of 15 seconds reduced carbonate formation by 31%.

Figure 4B:
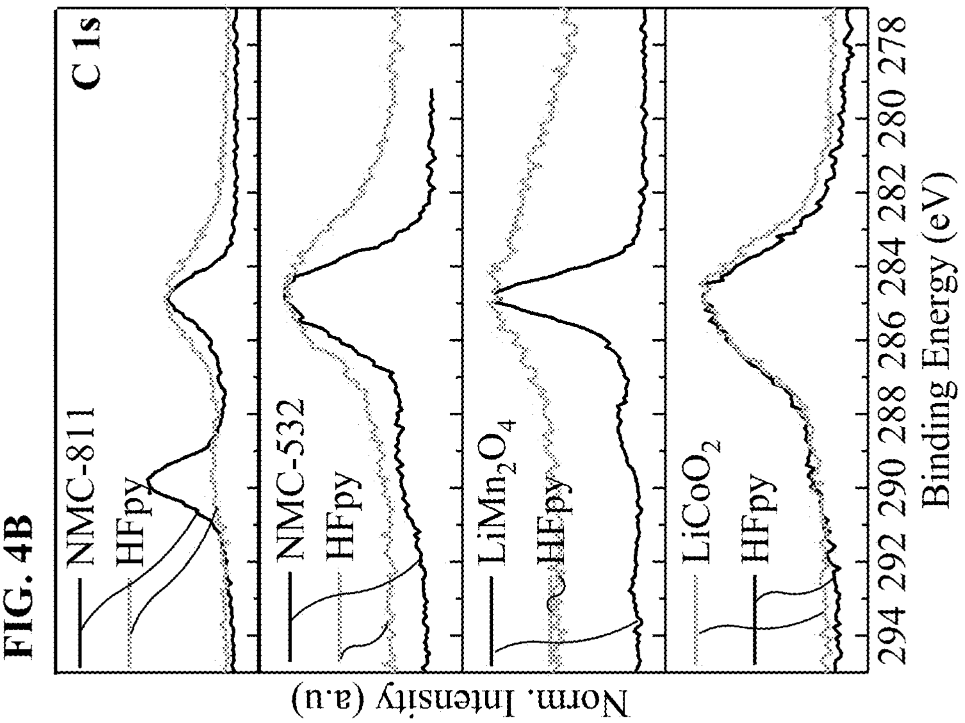
FIG. 4A-4F show the XPS plots at 30 Torr HFpy with varying cathode materials as the electrode material for C 1s (FIG. 4A-4B), Co 2p (FIG. 4C), Ni 2p (FIG. 4D), Mn 2p (FIG. 4E), Li 1s (FIG. 4F), and Zr 3d (FIG. 4F).
Figure 4A:
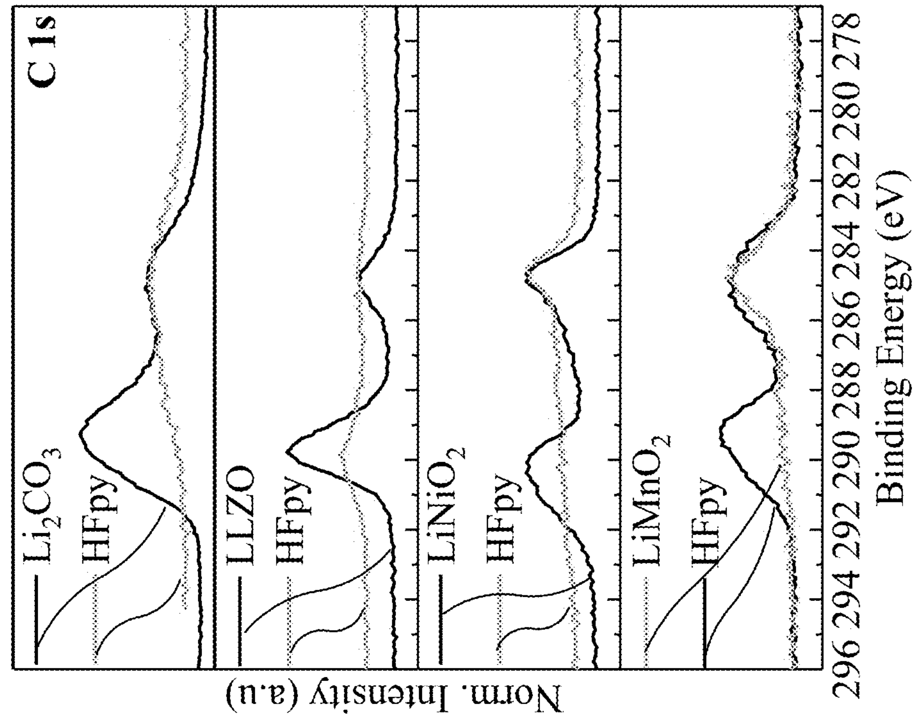

FIG. 4A-4F show the XPS plots before treatment and after treatment. For the experiments analyzed in FIG. 4A-4B, the normalized C is XPS to atmospheric carbon at 284.8 eV resulted from a treatment process involving flow of HFpy vapor to carbonate covered cathode materials at 30 Torr in a reactor at 100° C. FIG. 4A shows the carbonate peak at 290 eV upon HFpy adsorption for four cathode materials ($Li_2CO_3$, $LiLaZrO_2$, $LiNiO_2$, and $LiMnO_2$) with a reduction in the carbonate peak for $Li_2CO_3$, $LiLaZrO_2$, and $LiNiO_2$. FIG. 4B shows the carbonate peak upon HFpy adsorption for four other cathode materials ($LiNi_{0.8}Mn_{0.1}Co_{0.1}O_2$, $LiNi_{0.5}Mn_{0.3}Co_{0.2}O_2$, $LiMn_2O_4$, and $LiCoO_2$) with a reduction in the carbonate peak for $LiNi_{0.8}Mn_{0.1}Co_{0.1}O_2$ and $LiMn_2O_4$.

Figure 4D:
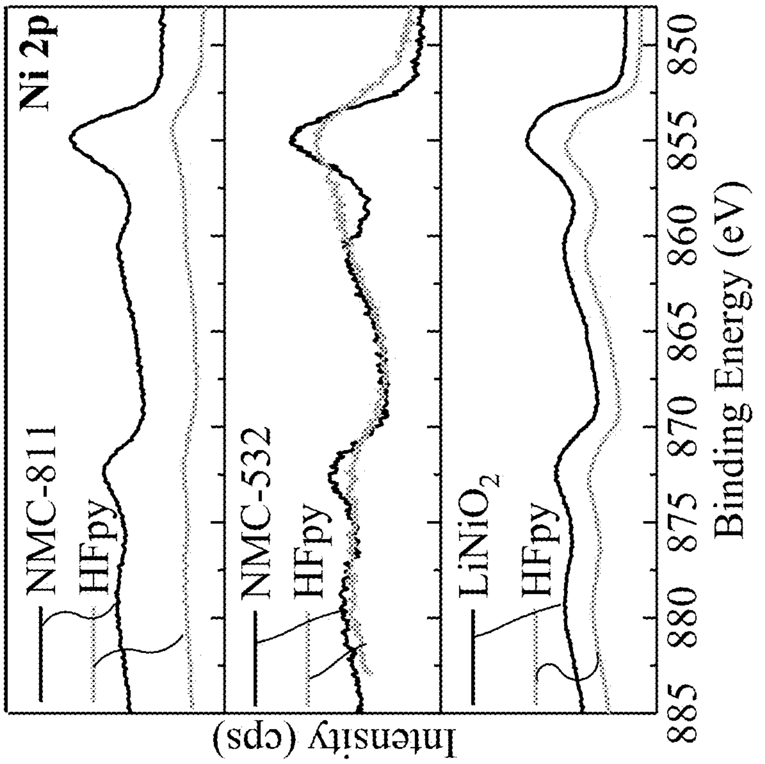
Figure 4C:
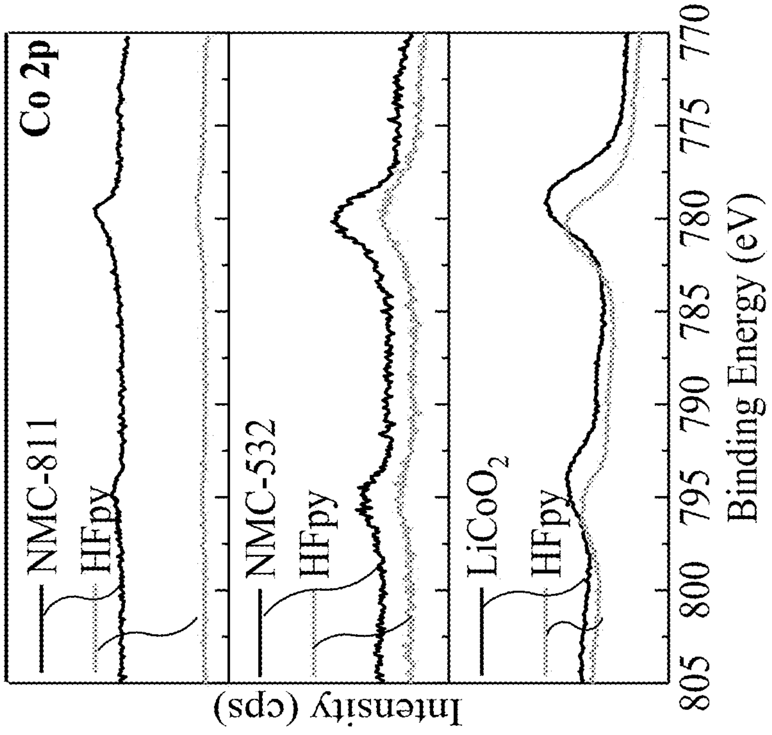
Figure 4F:
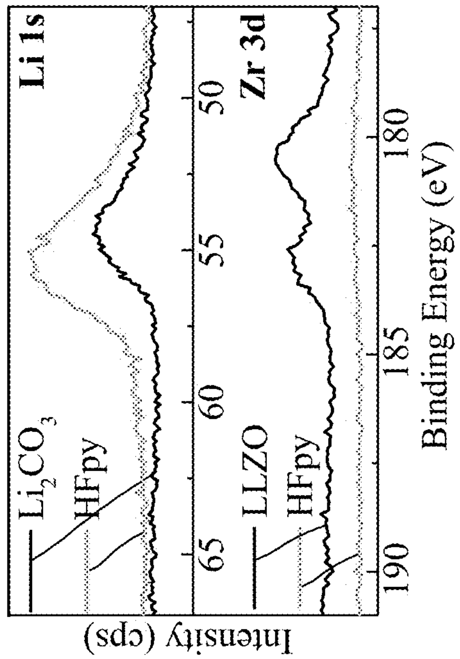
Figure 4E:
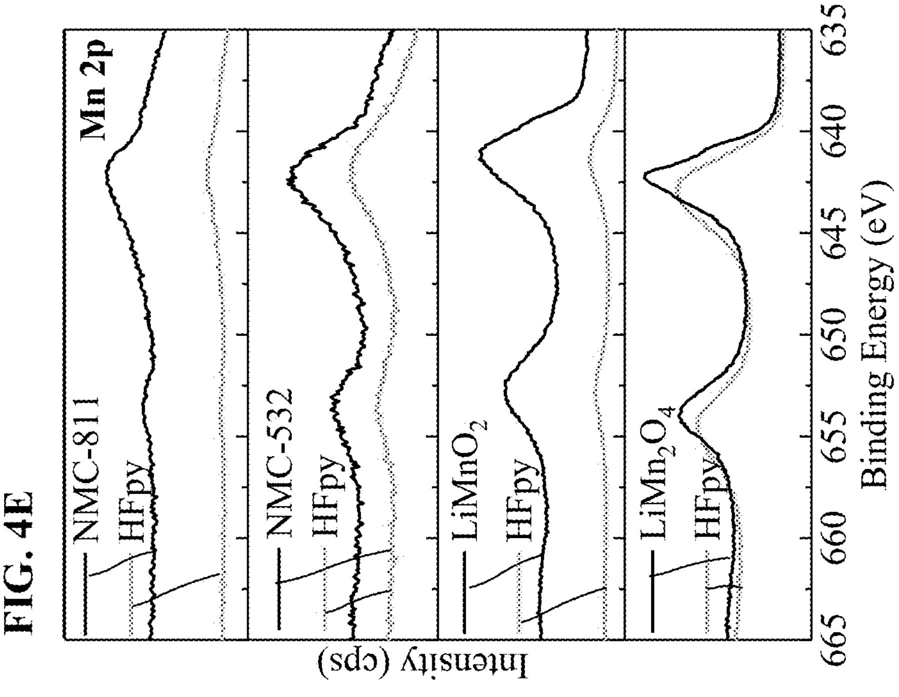

FIG. 4C-4F show plots from a treatment process involving flow of HFpy vapor to carbonate covered cathode materials at 30 Torr in a reactor at 100° C. FIG. 4C-4E show the attenuation of transition metal peaks under this treatment process. FIG. 4C shows the Co 2p XPS in cobalt-based cathode materials ($LiNi_{0.8}Mn_{0.1}Co_{0.1}O_2$, $LiNi_{0.5}Mn_{0.3}Co_{0.2}O_2$, and $LiCoO_2$). FIG. 4D shows the Ni 2p XPS in nickel-based cathode materials ($LiNi_{0.8}Mn_{0.1}Co_{0.1}O_2$, $LiNi_{0.5}Mn_{0.3}Co_{0.2}O_2$, and $LiNiO_2$). FIG. 4E shows the Mn 2p XPS in manganese-based cathode materials (($LiNi_{0.8}Mn_{0.1}Co_{0.1}O_2$, $LiNi_{0.5}Mn_{0.3}Co_{0.2}O_2$, $LiMnO_2$, and $LiMn_2O_4$). FIG. 4F shows the increase in the Li is peak in intensity due to the formation of a LiF shell and the decrease in Zr 3d peak upon HFpy dosing.

Figure 5B:
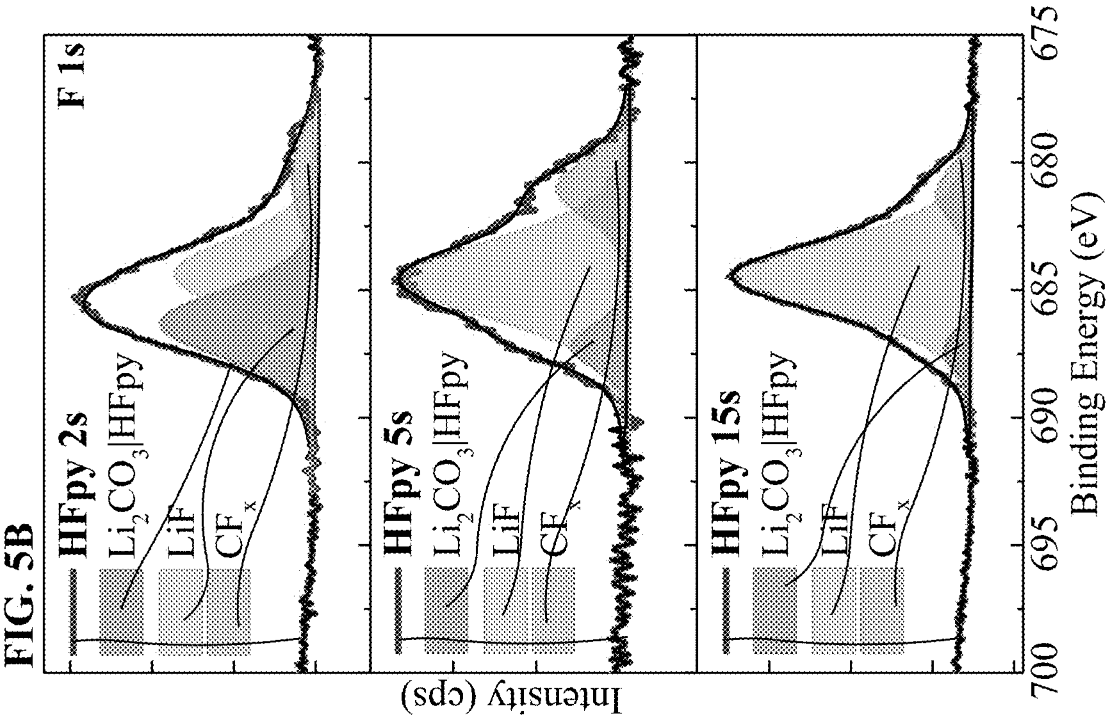
FIG. 5A-5B show the F 1s XPS plots at varying dose times.
Figure 5A:
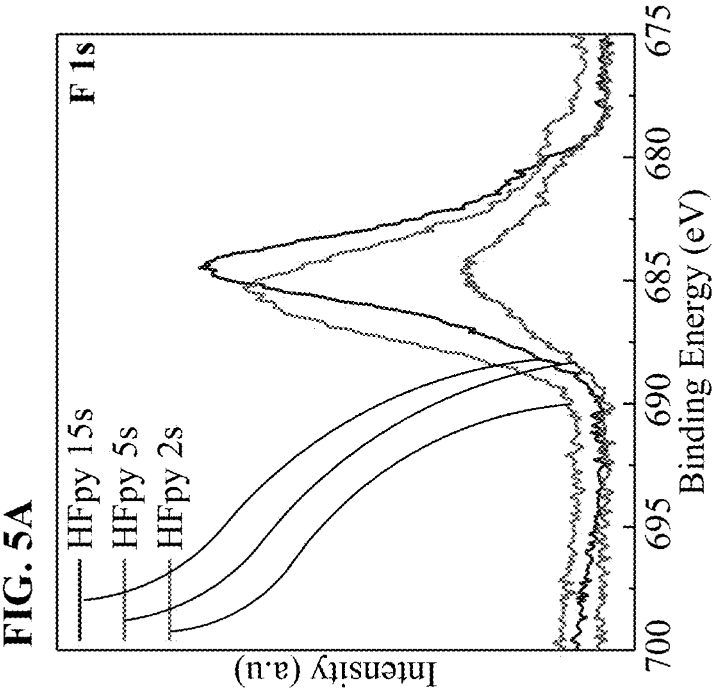

FIG. 5A-5B show the XPS plots for F is at varying dose times at 15 Torr HFPy dosing on $Li_2CO_3$. In FIG. 5A, dose time is shown at 2 seconds, 5 seconds, and 15 seconds with the F is peak intensity increasing at 2 seconds, decreasing partially at 5 seconds, and increasing again at 15 seconds. FIG. 5B shows an increasing percentage of LiF formation on the surface of $Li_2CO_3$ with increasing dose time of HFpy as quantified from the area under the F peak corresponding to LiF. For a dose time of 2 seconds, 44% LiF is formed. For a dose time of 5 seconds, 73% LiF is formed. For a dose time of 15 seconds, 86% LiF is formed.

Figure 6:
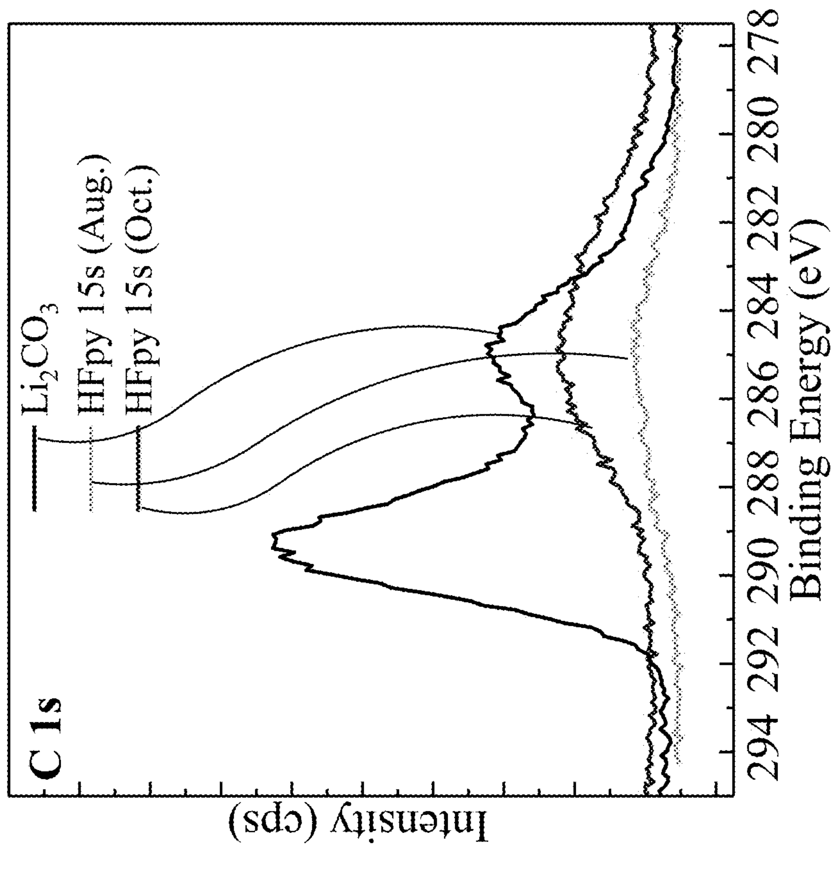
FIG. 6 shows the C 1s XPS plot for the coated electrode material after a period of three months.

FIG. 6 shows the C 1s XPS plot on $Li_2CO_3$ immediately after treatment with HFpy (August) and after a period of three months exposure to atmosphere (October). The treated $Li_2CO_3$ powders do not show the presence of carbonate at 290 eV even after exposing the powders to atmosphere for 3 months.

Figure 7:
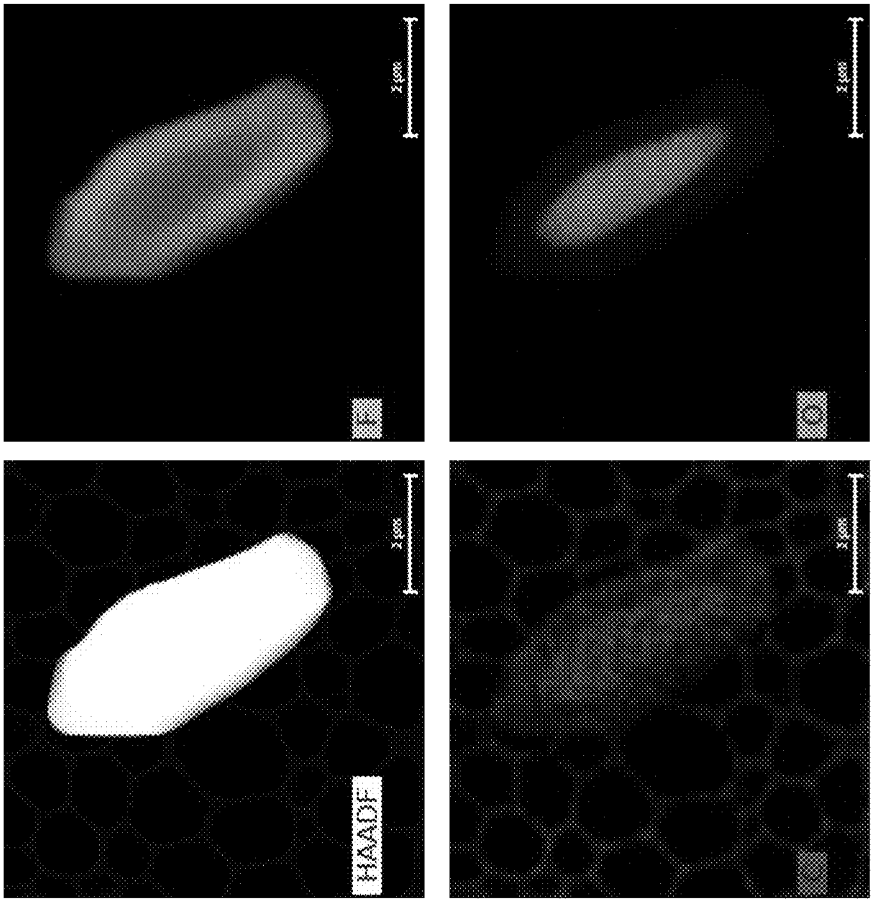
FIG. 7 is high-angle annular dark-field imaging (HAADF) from scanning transmission electron microscopy (STEM) that shows the amounts of fluorine, carbon, and oxygen after LiF shell formation.

FIG. 7 is high-angle annular dark-field imaging (HAADF) from scanning transmission electron microscopy (STEM) that shows the amounts of fluorine, carbon, and oxygen after LiF shell formation following exposure of a $Li_2CO_3$ powder to HFPy. The LiF shell can be seen from the image depicting fluorine, and the shell is clearly conformal. There is a reduction in amount of carbonates in the shell as evidenced by the reduced C signal.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms “coupled,” “connected,” and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and tables in a particular order, this should not be understood as requiring that such operations be performed in the particular order shown or in sequential order, or that all illustrated operations be performed, to achieve desirable results. Thus, particular implementations of the invention have been described. Other implementations are within the scope of the following claims. In some cases, the actions recited in the claims can be performed in a different order and still achieve desirable results.

We claim:

1. A method, comprising:

disposing a cathode material comprising lithium that is at least partially covered with a surface carbonate comprising $Li_2CO_3$, in a reactor; and introducing a vapor of a fluoride-based precursor material comprising HF-pyridine into the reactor at a vapor pressure and dose time sufficient to react and convert at least a portion of the surface carbonate with the vapor of the fluoride-based precursor to lithium fluoride, to form a layer of a metal fluoride coating comprising lithium fluoride on the cathode material and remove the portion of the surface carbonate on the cathode material;

wherein the reacting is performed at a temperature in a range of 40° C. to 250° C.;

and the lithium of the lithium fluoride of the metal fluoride coating is from the $Li_2CO_3$.

2. The method of claim 1, wherein the metal fluoride coating has a thickness in a range of 0.1 nm to 5 nm.

3. The method of claim 1, wherein the vapor pressure is about 15 Torr to about 30 Torr and the dose time is about 2 seconds to 15 seconds.

4. The method of claim 1, wherein the introducing a vapor of the fluoride-based precursor material into the reactor comprises consecutively dosing the vapor of the fluoride-based precursor material into the reactor for a number of cycles.

5. The method of claim 1, wherein the introducing a vapor of a fluoride-based precursor material into the reactor comprises a dose time in a range of 0.1 second to 30 seconds.

6. The method of claim 1 wherein the surface carbonate further comprises $NiCO_3$, $Ni_2(CO_3)_3$, $CoCO_3$, $Co_2(CO_3)_3$, $Co(CO_3)_2$, $MnCO_3$, $Mn(CO_3)_3$, or $Mn(CO_3)_2$, or a combination of two or more thereof.

7. The method of claim 1, wherein the cathode material comprises one of $Li_2CO_3$, $LiCoO_2$, $LiMnO_2$, $LiNiO_2$, $LiMnO_4$, $LiLaZrO_2$, $LiNi_{0.5}Mn_{0.3}Co_{0.2}O_2$, or $LiNi_{0.8}Mn_{0.1}Co_{0.1}O_2$.

8. The method of claim 1, wherein the cathode material comprises $LiNi_{0.5}Mn_{0.3}CO_{0.2}O_2$, $LiNi_{0.8}Mn_{0.1}Co_{0.1}O_2$, or a combination thereof; and the metal fluoride coating further comprises $Li_aNi_bCo_cMn_dF_e$ where a, b, c, d, and e are greater than 0.

9. The method of claim 1, wherein the method does not include contacting the cathode material with a different precursor material.

10. The method of claim 1, further comprising sequentially repeating reacting the vapor of the fluoride-based precursor material with the surface carbonate for 1 to 10 times.

11. The method of claim 1, wherein the reacting is performed at a temperature of about 100° C. and a pressure of about 15 Torr.

12. The method of claim 11, wherein the removing the portion of surface carbonate on the cathode material comprises reducing surface carbonate by about 25% to about 31% as measured by X-ray photoelectron spectroscopy.

13. A method, comprising:

disposing a cathode material that is at least partially covered with a surface carbonate, in a reactor; and reacting a vapor of a fluoride-based precursor material comprising HF-pyridine with the surface carbonate, doping the surface carbonate with a vapor of a fluoride-based precursor, so as to form a layer of a metal fluoride coating comprising lithium fluoride on the cathode material and reducing an amount of the surface carbonate on the cathode material;

wherein the reacting is performed at a temperature in a range of 40° C. to 250° C.;

wherein the method does not include contacting the cathode material with a different precursor material.

14. The method of claim 13, wherein the metal fluoride coating has a thickness in a range of 0.1 nm to 5 nm.

15. The method of claim 13, wherein doping the surface carbonate is performed at a vapor pressure in a range of 0.1 Torr to 100 Torr.

16. A method, comprising:

disposing a cathode material that is at least partially covered with a surface carbonate, in a reactor; and reacting a vapor of a fluoride-based precursor material comprising HF-pyridine with the surface carbonate, doping the surface carbonate with a vapor of a fluoride-based precursor, so as to form a layer of a metal fluoride coating comprising lithium fluoride on the cathode material and reducing an amount of the surface carbonate on the cathode material;

sequentially repeating reacting the vapor of the fluoride-based precursor material with the surface carbonate for 1 to 10 times;

wherein the reaching is performed at a temperature in a range of 40° C. to 250° C.;

wherein the metal fluoride coating has a thickness in a range of 0.1 nm to 5 nm;

wherein doping the surface carbonate is performed at a vapor pressure in a range of 0.1 Torr to 100 Torr;

wherein the method does not include contacting the cathode material with a different precursor material.

* * * * *